United States Patent [19]

Link

[11] Patent Number: 4,521,823

[45] Date of Patent: Jun. 4, 1985

[54] SUBMERSIBLE PRIMARY CIRCUIT BREAKER

[75] Inventor: Edwin A. Link, Waukesha, Wis.

[73] Assignee: RTE Corporation, Waukesha, Wis.

[21] Appl. No.: 412,602

[22] Filed: Aug. 30, 1982

[51] Int. Cl.[3] .................................... H02H 7/04

[52] U.S. Cl. .................................... 361/38; 361/14

[58] Field of Search .................... 361/14, 35–38; 200/144 C, 149 A; 337/6, 74, 75, 277, 282, 359

[56] References Cited

U.S. PATENT DOCUMENTS 2,223,530 12/1940 Putman .................... 361/37

2,280,884 4/1942 Barrow et al. .................... 361/37 X 2,343,132 2/1944 Barr .................... 361/37

2,773,155 12/1956 Friedrich .................... 361/14 X 3,983,454 9/1976 Cotton et al. .................... 337/6 X 4,435,690 3/1984 Link et al. .................... 361/37 X

*Primary Examiner*—Harry E. Moose, Jr.

*Attorney, Agent, or Firm*—Raymond E. Fritz, Jr.; Ronald E. Barry

[57] ABSTRACT

A primary power circuit breaker adapted to be immersed in the dielectric fluid for a transformer, the breaker including an arc interrupting assembly for extinguishing the arc produced on load break; a trip free mechanism responsive to primary, secondary or primary-secondary differential current signals and thermally responsive to fluid temperature, and an externally operable reset assembly for closing the circuit breaker.

5 Claims, 8 Drawing Figures

SUBMERSIBLE PRIMARY CIRCUIT BREAKER

BACKGROUND OF INVENTION

The present invention relates to electrical apparatus such as transformers and more particularly to protective devices located within the apparatus casing for interrupting the power circuit in response to an electrical fault and overload conditions. A number of systems for protecting distribution transformers from such conditions, such as fuses, have been used to provide fault current protection in combination with temperature responsive devices for providing overload protection. Most of these devices are either destructive type systems such as the fuses which must be replaced or that require opening of the transformer casing to reset or replace the device.

SUMMARY OF THE INVENTION

The self-protected transformer according to the present invention is provided with an internal high voltage circuit breaker which can be manually or automatically operated and reset externally of the transformer casing. An arc interrupter assembly has been incorporated into the circuit breaker which provides a cross blast arc interrupter feature for high voltage operation which is considered unique in this type of operation. Various types of trip free operating mechanisms, both electrically and thermally responsive, can be used to trip the interrupter to provide primary circuit protection, secondary circuit protection, combined primary and secondary circuit protection, as well as thermal protection.

IN THE DRAWINGS

DESCRIPTION OF THE INVENTION

Figure 3:
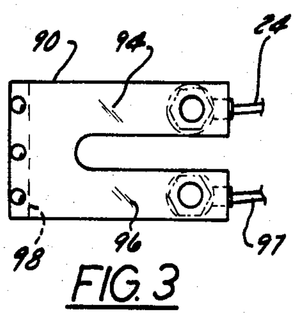
FIG. 3 is a top view of the bimetal actuator.

The high voltage transformer 10 of the type contemplated herein consists of a casing 12 and a coil and core assembly 14 immersed in a dielectic fluid 16 provided in the casing 12. The coil and core assembly 14 includes a primary winding 18 and a secondary winding 20. The primary winding 18 is connected to the primary bushings 22 by high voltage lines 24. The secondary winding 20 is connected to the service lines 26 through secondary bushings 28.

The transformer is protected from predetermined electrical and thermal conditions by means of a high voltage circuit breaker 30 connected in a series relation to the primary winding 18 by lines 24. The circuit breaker 30 is of the dual characteristic type which is capable of responding to both electrical and thermal signals to interrupt the primary circuit. A circuit breaker of this general type is disclosed in my co-pending application Ser. No. 371,776, filed on Apr. 26, 1982 now Pat. No. 4,435,690 and entitled Primary Circuit Breaker. As disclosed in my co-pending application, the circuit breaker includes a trip free mechanism which utilizes a magnet as the means for sensing both electrical and thermal fault conditions to trip the interrupter.

Figure 2:
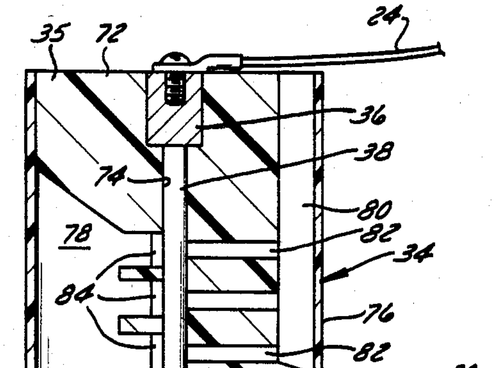
FIG. 2 is a cross sectional side view of the circuit breaker shown biased to a closed position.
Figure 2:
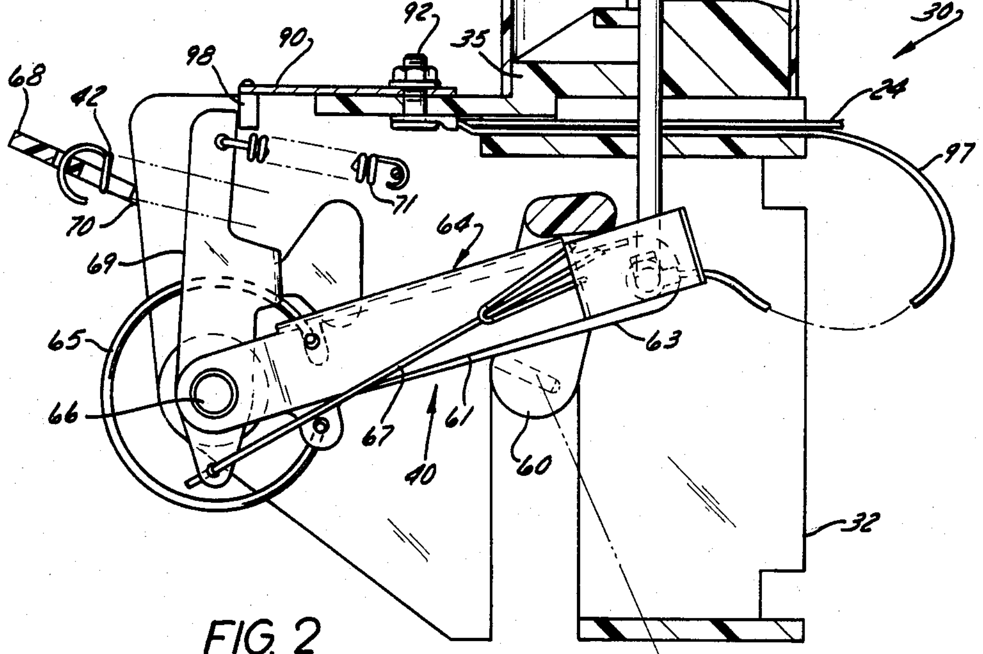
Figure 2:
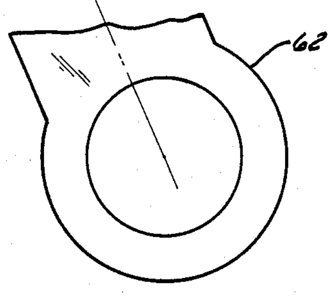
Figure 1:
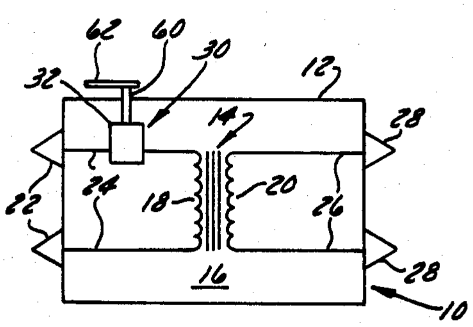
FIG. 1 is a schematic circuit diagram of a top view of a transformer showing the circuit breaker connected to the primary winding of the transformer.
Figure 4:
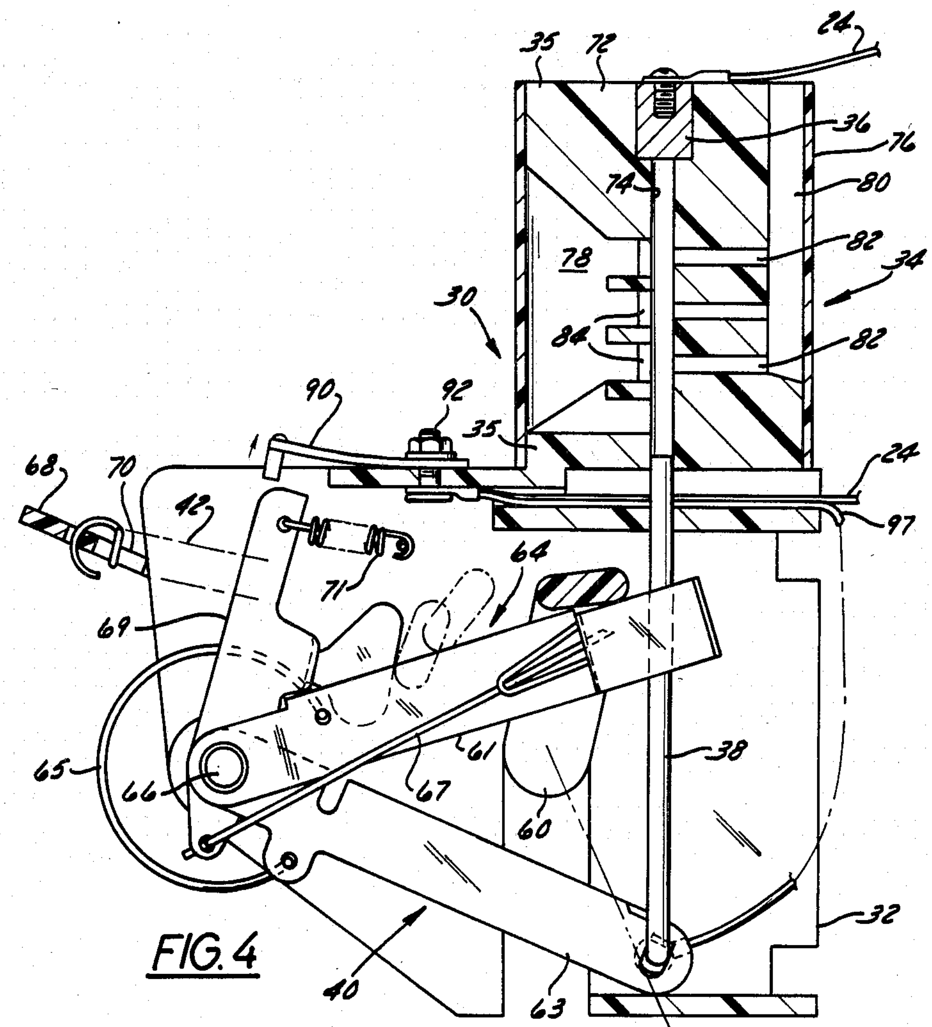
FIG. 4 is a view similar to FIG. 2 showing the circuit breaker in the open position.
Figure 4:
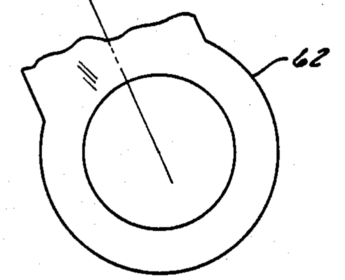

Referring to FIGS. 2 and 4, the circuit breaker 30 of the type contemplated herein includes an insulating frame 32 supporting an arc interruption assembly 34. The arc interruption assembly 34 includes a fixed contact 36 and a rod contact 38 which is moveable into engagement with the fixed contact 36. The rod contact 38 is moved between open and closed positions with respect to the fixed contact 36 by means of a latch mechanism 40. The latch mechanism 40 is substantially the same as disclosed in my copending application 371,776.

In this regard, the latch mechanism 40 includes an operating shaft 60 having a handle 62 and a lever arm assembly 64 pivotally mounted on a boss 66 on the frame 32. It should be noted that the handle 62 can be located outside of the transformer tank to allow for opening and closing of the circuit breaker externally of the transformer tank. The lever arm assembly 64 includes a first lever arm 61 and a second lever arm 63. The two lever arms 61 and 63 are both pivoted about the boss 66 to open and close the circuit breaker. The second lever arm 63 is connected to the moveable rod 38.

Means are provided for biasing the first lever arm 61 to the circuit breaker open or closed positions. Such means is in the form of the over center spring 42 which has one end connected to the lever arm 61 and the other end connected to the shaft 60 by means of a bail 68. In this regard the bail 68 is in the form of a U-shaped member having legs 70 connected to the shaft 60. On rotation of the shaft 60 the bail 68 will be moved from a first position above the boss 66 to a second position below the boss 66. In the position shown in FIG. 2, the spring 42 is used to bias the rod 38 into engagement with contact 36. In the second position the spring 42 is used to bias the lever arm 63 clockwise around boss 66 and the rod 38 away from the contact 32.

The second lever arm 63 is biased by means of a spring 65 to rotate away from the first lever arm 61 to open the circuit breaker. Means are provided for latching the second lever arm 63 to the first lever arm 61 so that the two lever arms move as a unit in response to the position of spring 42. Such means is in the form of a rod 67 having one end connected to a trip lever 69 and the other end positioned to engage the second lever arm 63. The trip lever 69 is mounted for pivotal movement on boss 66 and is biased by means of a spring 71 to release the rod 67 from the lever arm 63.

Means are provided for holding the lever arm 63 in the latched position, i.e., with rod 67 engaging the lever arm 63. Such means is in the form of a temperature responsive member 90 secured to the frame 32 by bolts 92. The temperature responsive member as seen in FIG. 3 is in the form of a bimetal having a pair of legs 94 and 96. A stop member 98 is secured to the free end of the bimetal member 90 by rivets and is located in a position to engage the trip lever 69. When the bimetal responds to an increase in temperature, the stop member will be moved out of the path of travel of the trip lever 69. The trip lever will rotate clockwise due to the bias of the spring 71, releasing the rod 67 from the lever arm 63. The lever arm 63 will then be biased by the spring 65 to move the rod 38 out of engagement with the contact 36.

The bimetal member will respond to both the heat of the oil in the transformer casing as well as the heat produced by a high fault current in the primary line. In this regard, it should be noted that the rod 38 is connected to the bimetal leg 96 by a line 97. The bimetal leg 94 is connected to the transformer coil 18 by a line 24. The bimetal member 90 is thus connected in series with the primary circuit to the coil 18 and will respond to high fault currents in the primary line. Since the bimetal is also immersed in the oil within the transformer, secondary faults which produce an increase in temperature in the transformer oil will also cause the bimetal to move the stop member 98 out of the path of travel of the trip lever 69.

Figure 5:
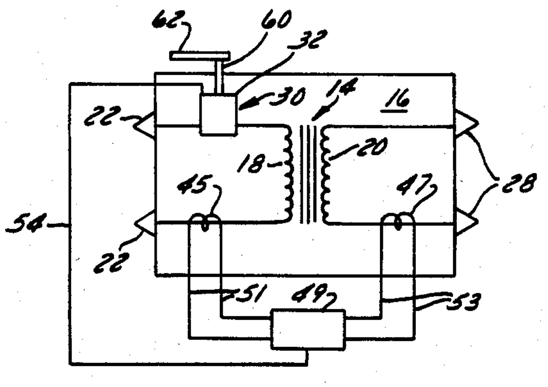
FIG. 5 is a schematic circuit diagram of the circuit breaker connected to respond to variations in the primary to secondary current ratio.

In FIG. 5 a circuit diagram is shown for connecting the circuit breaker to respond to both primary and secondary faults. It should be noted that a first or primary current transformer 45 is provided on one of the primary bushings 22 and a second or secondary current transformer 47 is provided on one of the secondary bushings 28. The primary current transformer 45 is connected to a trip coil 49 by lines 51. The secondary current transformer 47 is connected to the trip coil 49 by lines 53. The trip coil 49 can be connected to a solenoid in the circuit breaker 30 by line 54. The solenoid can be connected to trip the latch mechanism directly or positioned to move the bimetal to release the latch mechanism.

Under normal operating conditions a predetermined ratio of primary current to secondary current will exist in the transformer. Under these conditions, the trip coil 49 will be in balance and no current will flow to the circuit breaker 30. Whenever an overcurrent occurs on either the primary or secondary winding 18, 20 the trip coil will energize the circuit breaker to release the latch mechanism.

The arc interruption assembly 34 is also unique in that it provides a cross blast flow of arc extinguishing gases across the space between the rod 38 and contact 36 on load break. As seen in FIGS. 2 and 4 the assembly 34 includes a core 72 enclosed by means of a cylindrical sleeve 76. The core 72 is formed of material which will produce an arc extinguishing gas when exposed to the heat of an arc. The core is provided with an axially extending bore 74 and a cylindrical end cap 35 at each end. The contact 36 is mounted at one end of the bore 74 and the rod 38 is moveable through the bore 74 into engagement with the contact 36. The core is enclosed by means of the fiberglass sleeve 76 which is mounted on the end caps 35. The space between the end caps 35 and within the sleeve 76 defines an expansion chamber 78. An exhaust passage 80 is provided in the core 72 and is connected to the bore 74 by passages 82. The space 78 is connected to the bore 74 through openings 84.

When the rod 38 is moved away from the contact 36 under a fault current condition, the heat of the arc will generate a deionizing gas under high pressure in the bore 74. The deionizing gas will expand into the expansion chamber 78 and into the discharge duct 80. As the gases in passage 80 are discharged to the atmosphere the pressure in passage 80 will drop and the high pressure gases in the chamber 78 will flow through openings 84 across the bore 74 and into the passages 82 for discharging through passage 80. The flow of these gases across bore 74 will blow the arc out.

Figure 7:
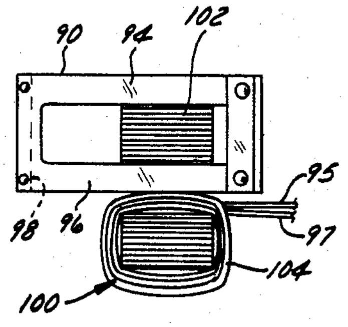
FIG. 7 is a top view of the modified bimetal trip member of FIG. 6.
Figure 6:
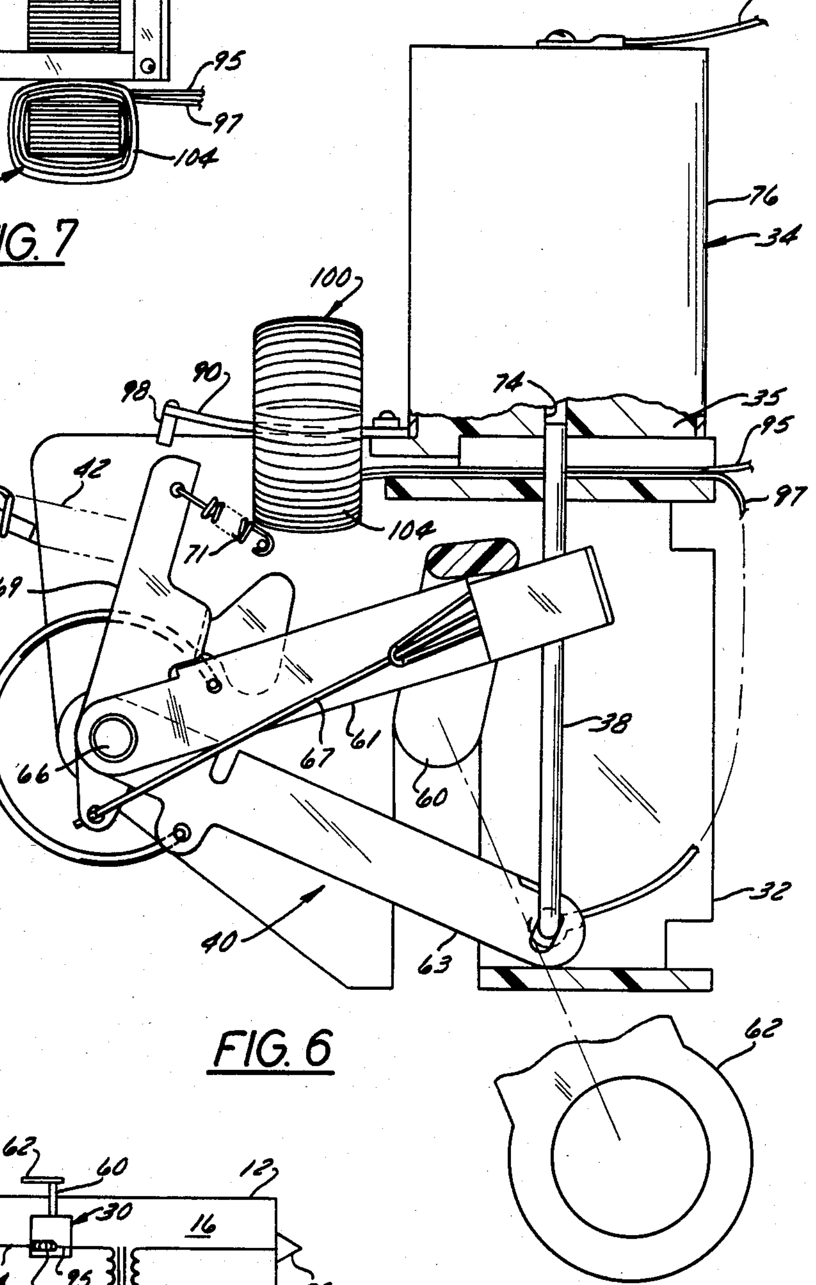
FIG. 6 is a side elevation view of the circuit breaker with a modified bimetal trip member.
Figure 8:
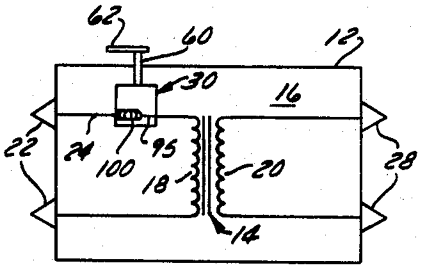
FIG. 8 is a schematic circuit diagram of a circuit for the circuit breaker of FIG. 6.

In the embodiment of the invention shown in FIGS. 6, 7 and 8 identical parts of the circuit breaker have been identified by the same numbers as used in the other embodiments of the invention. The present embodiment includes means in the form of a current transformer 100 for amplifying the current in small KVA distribution transformers in order to produce sufficient heat to actuate the bimetal 90. In this regard the current transfomer 100 includes a core 102 and a coil 104. The coil 104 is connected in series in the primary circuit by lines 95 and 97. The core 102 is positioned between the legs 94, 96 of the bimetal 90 to provide a shorted turn between the legs 94, 96. Under normal operating currents the current transformer will not produce sufficient heat to change the position of the bimetal. As the current increases the heat produced in the core 102 will cause the bimetal 90 to rise releasing the catch 98 from the path of travel of the trip lever 69. If the current increase is rapid or instantaneous, the magnetic force produced in the core 102 will be sufficient to cause a mechanical movement of the bimetal 90 thereby releasing the latch 98 from trip lever 69.

In FIG. 8 a circuit diagram is shown for the embodiment of FIGS. 6 and 7. The current transformer coil 104 is shown connected to the primary bushing 22 and the primary coil 18. Heat generated in the coil 104 will be transmitted directly across the legs of the bimetal 90. Depending on the amount of increase in current, the bimetal will either be released from the trip lever 69 slowly by the heat generated in the coil or rapidly by the magnetic force of the core imposed on the bimetal.

I claim:

1. In a self-protected transformer including a casing having a coil and core assembly immersed in a dielectric fluid within said casing, the assembly including primary and secondary circuits, the improvement comprising a circuit breaker in the primary circuit, said circuit breaker being immersed in the dielectric fluid and operatively connected to said coil and core assembly, said circuit breaker including trip-free means responsive to predetermined electrical conditions to interrupt the power circuit to the coil and core assembly, said trip-free means includes a U-shaped bimetal and a current transformer mounted on one leg of said bimetal, said current transformer being connected in series with said primary circuit of said transformer whereby said bimetal will respond to the heat generated by the current transformer and/or the magnetic force of the current transformer core.

2. The transformer according to claim 1 including means external to the transformer casing for opening and closing the circuit breaker.

3. The transformer according to claim 1 including means external to said casing for reclosing said circuit breaker.

4. The transformer according to claims 1, 2 or 3 wherein said bimetal is responsive to the temperature of said fluid to open said circuit breaker.

5. In a self-protected transformer including a casing having a coil and core assembly immersed in a dielectric fluid within said casing, the assembly including primary and secondary circuits, the improvement comprising a circuit breaker in the primary circuit, said circuit breaker being immersed in the dielectric fluid and operatively connected to said coil and core assembly, said breaker including a trip-free means responsive to predetermined electrical conditions to interrupt the power circuit to the coil and core assembly, and an arc interruption assembly including a core formed of an arc quenching material and having an end cap at each end, and a bore through the center of the core, a sleeve mounted on said ends caps to enclose said core and define a pressure chamber and a vent passage in said core between said end caps, a first contact mounted on said core at one end of said bore and a rod contact movable in said bore into engagement with said first contact, said core including a series of openings connecting said pressure chamber to said vent passage to provide a cross blast flow of arc quenching material through the space between the contacts on load break.

* * * * *